Patented May 4, 1954

2,677,617

UNITED STATES PATENT OFFICE 2,677,617

STABILIZATION OF ORGANIC COMPOUNDS

Ralph B. Thompson, Hinsdale, Ill., assignor to Universal Oil Products Company, Des Plaines, Ill., a corporation of Delaware No Drawing. Application December 15, 1952, Serial No. 326,145

24 Claims. (Cl. 99—163)

This application is a continuation-in-part of co-pending application, Serial No. 110,873, filed August 17, 1949, and relates to the stabilization of organic compounds which tend to deteriorate in storage or in use due to oxidation or other reactions.

The novel method of the present invention may be utilized for the stabilization of various organic compound materials which are subject to oxidative deterioration and include motor fuel, particularly unsaturated gasolines as, for example, cracked gasoline and polymer gasoline, diesel oil, mineral oil, lubricating oil, fuel oil, drying oil, greases, rubber, monomers including styrene, butadiene, etc., paraffin waxes, edible fats and oils, etc. These materials are adversely affected by oxygen, with the resultant formation of undesirable gum, discoloration, rancidity or other deleterious reactions.

The invention is particularly applicable to the stabilization of edible fats and oils which generally are of animal or vegetable origin and which tend to become rancid especially during long periods of storage prior to use. Typical representatives of these edible fats and oils include linseed oil, menhaden oil, cod liver oil, castor oil, olive oil, rapeseed oil, coconut oil, palm oil, corn oil, sesame oil, peanut oil, babassu oil, butter, fat, lard, beef tallow, etc., as well as the hydrogenated oils. It is understood that other oils and fats may be treated within the scope of the present invention, including oils and fats which have previously been subjected to various treatments, such as blowing with air, heat treatment, etc.

In one embodiment the present invention relates to a method of stabilizing an organic compound subject to oxidative deterioration which comprises adding thereto an inhibitor having the following general formula:

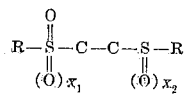

where R is an organic radical and $X_1$ and $X_2$ are selected from 0 and 1.

In a specific embodiment the present invention relates to a method of stabilizing edible fats and oils against rancidity which comprises incorporating therein an inhibitor comprising ethyl-β-ethylthioethyl sulfoxide.

In another specific embodiment the present invention relates to a method of stabilizing edible fats and oils against rancidity which comprises incorporating therein an inhibitor comprising 1,2-bis-(2-ethylsulfonylethylthio)-ethane.

In another embodiment the present invention relates to an organic compound and particularly an edible fat and oil containing an inhibitor as herein set forth.

The inhibitors of the present invention are represented by the following general formula:

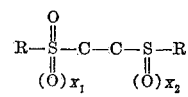

where R is an organic radical and $X_1$ and $X_2$ are selected from 0 and 1.

It will be noted, from the general formula hereinbefore set forth, that the inhibitors of the present invention contain at least two sulfur atoms in a position beta to each other, at least one of the sulfur atoms being attached to at least one oxygen atom. It is an essential feature of the present invention that the compounds contain this configuration.

Referring to the general formula hereinbefore set forth, it will be noted that $X_1$ and $X_2$ are 0 and/or 1. Where both $X_1$ and $X_2$ are 0, the inhibitor comprises a sulfoxide having a sulfur atom beta to the sulfoxide group. Preferred inhibitors of this class comprise alkyl β-alkylthioalkyl sulfoxides which may be represented by the following formula:

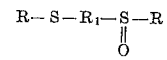

where $R_1$ is an alkyl group of at least two carbon atoms and R is an organic radical. The preferred inhibitor in this class is ethyl β-ethylthioethyl sulfoxide as further illustrated by the following formula:

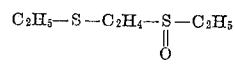

Other satisfactory but not necessarily equivalent compounds of this class include methyl β-ethylthioethyl sulfoxide, propyl β-ethylthioethyl sulfoxide, butyl β-ethylthioethyl sulfoxide, amyl β-ethylthioethyl sulfoxide, hexyl β-ethylthioethyl sulfoxide, heptyl β-ethylthioethyl sulfoxide, octyl β-ethylthioethyl sulfoxide, methyl β-propylthiopropyl sulfoxide, ethyl β-propylthiopropyl sulfoxide, propyl β-propylthiopropyl sulfoxide, butyl β-propylthiopropyl sulfoxide, amyl β-propylthiopropyl sulfoxide, hexyl β-propylthiopropyl sulfoxide, methyl β-butylthiobutyl sulfoxide, ethyl β-butylthiobutyl sulfoxide, propyl β-butylthiobutyl sulfoxide, butyl β-butylthiobutyl sulfoxide, methyl β-methylthioethyl sulfoxide, ethyl β-methylthioethyl sulfoxide, propyl β-methylthioethyl sulfoxide, butyl β-methylthioethyl sulfoxide, methyl β-propylthioethyl sulfoxide, ethyl β-propylthioethyl sulfoxide, propyl β-propylthioethyl sulfoxide, butyl β-propylthioethyl sulfoxide, methyl β-butylthioethyl sulfoxide, ethyl β-butylthioethyl sulfoxide, propyl β-butylthioethyl sulfoxide, butyl β-butylthioethyl sulfoxide, methyl β-butylthiopropyl sulfoxide, ethyl β-butylthiopropyl sulfoxide, propyl β-butylthiopropyl sulfoxide, butyl β-butylthiopropyl sulfoxide, etc. In place of alkyl radicals in the terminal positions as represented by R in the formula, it is understood that the inhibitor may contain cyclic radicals in one or both of these positions. The cyclic radical may comprise cyclohexyl, aryl, heterocyclic rings containing carbon and sulfur, oxygen and/or nitrogen, along with the accompanying hydrogen atoms.

Typical examples of specific compounds containing cyclic radicals include cyclohexyl β-cyclohexylthioethyl sulfoxide, cyclohexyl β-cyclohexylthiopropyl sulfoxide, cyclohexyl β-cyclohexylthiobutyl sulfoxide, etc., cyclohexyl β-ethylthioethyl sulfoxide, cyclohexyl β-ethylthiopropyl sulfoxide, cyclohexyl β-ethylthiobutyl sulfoxide, etc., phenyl β-phenylthioethyl sulfoxide, phenyl β-phenylthiopropyl sulfoxide, phenyl β-phenylthiobutyl sulfoxide, etc., phenyl β-ethylthioethyl sulfoxide, phenyl β-ethylthiopropyl sulfoxide, phenyl β-ethylthiobutyl sulfoxide, etc., tolyl β-tolylthioethyl sulfoxide, tolyl β-tolylthiopropyl sulfoxide, tolyl β-tolylthiobutyl sulfoxide, etc., tolyl β-ethylthioethyl sulfoxide, tolyl β-ethylthiopropyl sulfoxide, tolyl β-ethylthiobutyl sulfoxide, etc., pyridyl β-pyridylthioethyl sulfoxide, pyridyl β-pyridylthiopropyl sulfoxide, pyridyl β-pyridylthiobutyl sulfoxide, etc., pyridyl β-ethylthioethyl sulfoxide, pyridyl β-ethylthiopropyl sulfoxide, pyridyl β-ethylthiobutyl sulfoxides, etc., furyl β-furylthioethyl sulfoxide, furyl β-furylthiopropyl sulfoxide, furyl β-furylthiobutyl sulfoxide, etc., furyl β-ethylthioethyl sulfoxide, furyl β-ethylthiopropyl sulfoxide, furyl β-ethylthiobutyl sulfoxide, etc., thienyl β-thienylthioethyl sulfoxide, thienyl β-thienylthiopropyl sulfoxide, thienyl β-thienylthiobutyl sulfoxide, etc., thienyl β-ethylthioethyl sulfoxide, thienyl β-ethylthiopropyl sulfoxide, thienyl β-ethylthiobutyl sulfoxide, etc., quinolyl β-quinolylthioethyl sulfoxide, quinolyl β-quinolylthiopropyl sulfoxide, quinolyl β-quinolylthiobutyl sulfoxide, etc., quinolyl β-ethylthioethyl sulfoxide, quinolyl β-ethylthiopropyl sulfoxide, quinolyl β-ethylthiobutyl sulfoxide, etc.

Referring again to the general formula, where $X_1$ is 0 and $X_2$ is 1, the inhibitor will comprise a disulfoxide containing the sulfur atoms in a position beta to each other. Preferred compounds of this class include 1,2-bis-(alkylsulfinyl)-alkanes which may be represented by the following formula:

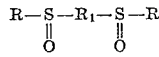

where $R_1$ comprises an alkyl radical of at least two carbon atoms and R is an organic radical. A preferred inhibitor in this class comprises 1,2-bis-(ethylsulfinyl)-ethane which is further illustrated by the following formula:

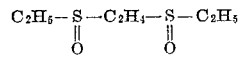

Other satisfactory but not necessarily equivalent inhibitors in this class include 1,2-bis-(methylsulfinyl)-ethane, 1,2-bis-(propylsulfinyl)-ethane, 1,2-bis-(butylsulfinyl)-ethane, 1,2-bis-(amylsulfinyl)-ethane, 1,2-bis-(hexylsulfinyl)-ethane, 1,2-bis-(heptylsulfinyl)-ethane, 1,2-bis-(octylsulfinyl)-ethane, 1,2-bis-(methylsulfinyl)-propane, 1,2-bis-(ethylsulfinyl)-propane, 1,2-bis-(propylsulfinyl)-propane, 1,2-bis-(butylsulfinyl)-propane, 1,2-bis-(amylsulfinyl)-propane, 1,2-bis-(methylsulfinyl)-butane, 1,2-bis-(ethylsulfinyl)-butane, 1,2-bis-(propylsulfinyl)-butane, 1,2-bis-(butylsulfinyl)-butane, etc. In general, it is preferred that all of the alkyl radicals are the same because of ease in preparation but it is understood that the present invention includes compounds in which these alkyl radicals are different, and also that the terminal radicals may be cyclic as hereinbefore set forth.

Typical examples of specific compounds containing cyclic radicals include 1,2-bis-(cyclohexylsulfinyl)-ethane, 1,2-bis-(cyclohexylsulfinyl)-propane, 1,2-bis-(cyclohexylsulfinyl)-butane, etc., 1,2-bis-(phenylsulfinyl)-ethane, 1,2-bis-(phenylsulfinyl)-propane, 1,2-bis-(phenylsulfinyl)-butane, etc., 1,2-bis-(tolylsulfinyl)-ethane, 1,2-bis-(tolylsulfinyl)-propane, 1,2-bis-(tolylsulfinyl)-butane, etc., 1,2-bis-(pyridylsulfinyl)-ethane, 1,2-bis-(pyridylsulfinyl)-propane, 1,2-bis-(pyridylsulfinyl)-butane, etc., 1,2-bis-(furylsulfinyl)-ethane, 1,2-bis-(furylsulfinyl)-propane, 1,2-bis(furylsulfinyl)-butane, etc., 1,2-(thienylsulfinyl)-ethane, 1,2-bis-(thienylsulfinyl)-propane, 1,2-bis-(thienylsulfinyl)-butane, etc., 1,2-bis-(quinolylsulfinyl)-ethane, 1,2-bis-(quinolylsulfinyl)-propane, 1,2-bis-(quinolylsulfinyl)-butane, etc.

Referring again to the general formula, where $X_1$ is 1 and $X_2$ is 0, the inhibitor will comprise a sulfone having at least two sulfur atoms in a position beta to each other. The preferred compounds of this class comprise alkyl β-alkylthioalkyl sulfones as represented by the following formula:

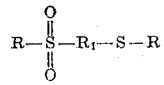

where $R_1$ is an alkyl radical of at least two carbon atoms and R is an organic radical. A preferred inhibitor of this class is ethyl β-ethylthioethyl sulfone which is illustrated by the formula:

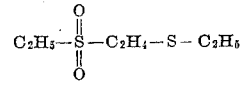

Other satisfactory but not necessarily equivalent sulfones of this class include methyl β-ethylthioethyl sulfone, propyl β-ethylthioethyl sulfone, butyl β-ethylthioethyl sulfone, amyl β-ethylthioethyl sulfone, hexyl β-ethylthioethyl sulfone, heptyl β-ethylthioethyl sulfone, octyl β-ethylthioethyl sulfone, methyl β-propylthiopropyl sulfone, ethyl β-propylthiopropyl sulfone, propyl β-propylthiopropyl sulfone, butyl β-propylthiopropyl sulfone, amyl β-propylthiopropyl sulfone, methyl β-butylthiobutyl sulfone, ethyl β-butylthiobutyl sulfone, propyl β-butylthiobutyl sulfone, methyl β-methylthioethyl sulfone, ethyl β-methylthioethyl sulfone, propyl β-methylthioethyl sulfone, butyl β-methylthioethyl sulfone, methyl β-propylthioethyl sulfone, ethyl β-propylthioethyl sulfone, propyl β-propylthioethyl sulfone, butyl β-propylthioethyl sulfone, methyl β-propylthiobutyl sulfone, ethyl β-propylthiobutyl sulfone, propyl β-propylthiobutyl sulfone, butyl β-propylthiobutyl sulfone, etc. As hereinbefore set forth in connection with the sulfoxides, it is preferred that the alkyl groups are the same because of ease in preparation but it is likewise understood that these alkyl radicals may be different and that the terminal radicals as represented by R in the formula may comprise cyclic radicals.

Typical examples of specific compounds containing cyclic radicals include cyclohexyl β-cyclohexylthioethyl sulfone, cyclohexyl β-cyclohexylthiopropyl sulfone, cyclohexyl β-cyclohexylthiobutyl sulfone, etc., cyclohexyl β-ethylthioethyl sulfone, cyclohexyl β-ethylthiopropyl sulfone, cyclohexyl β-ethylthiobutyl sulfone, etc., phenyl β-phenylthioethyl sulfone, phenyl β-phenylthiopropyl sulfone, phenyl β-phenylthiobutyl sulfone, etc., tolyl β-tolylthioethyl sulfone, tolyl β-tolylthiopropyl sulfone, tolyl β-tolylthiobutyl sulfone, etc., tolyl β-ethylthioethyl sulfone, tolyl β-ethylthiopropyl sulfone, tolyl β-ethylthiobutyl sulfone, etc., pyridyl β-pyridylthioethyl sulfone, pyridyl β-pyridylthiopropyl sulfone, pyridyl β-pyridylthiobutyl sulfone, etc., pyridyl β-ethylthioethyl sulfone, pyridyl β-ethylthiopropyl sulfone, pyridyl β-ethylthiobutyl sulfone, etc., furyl β-furylthioethyl sulfone, furyl β-furylthiopropyl sulfone, furyl β-furylthiobutyl sulfone, etc., furyl β-ethylthioethyl sulfone, furyl β-ethylthiopropyl sulfone, furyl β-ethylthiobutyl sulfone, etc., thienyl β-thienylthioethyl sulfone, thienyl β-thienylthiopropyl sulfone, thienyl β-thienylthiobutyl sulfone, etc., thienyl β-ethylthioethyl sulfone, thienyl β-ethylthiopropyl sulfone, thienyl β-ethylthiobutyl sulfone, etc., quinolyl β-quinolylthioethyl sulfone, quinolyl β-quinolylthiopropyl sulfone, quinolyl β-quinolylthiobutyl sulfone, etc., quinolyl β-ethylthioethyl sulfone, quinolyl β-ethylthiopropyl sulfone, quinolyl β-ethylthiobutyl sulfone, etc.

Referring again to the general formula, where $X_1$ equals 1 and $X_2$ equals 1 the inhibitor will have the following general formula:

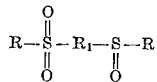

where $R_1$ comprises an alkyl group of at least two carbon atoms and R is an organic radical which may be alkyl, cyclic or heterocyclic as hereinbefore set forth. A representative inhibitor of this class is ethyl β-ethylsulfonylethyl sulfoxide as illustrated by the formula:

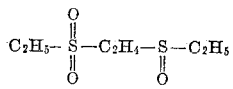

Here again, it is understood that the radicals R and $R_1$ may be the same or different, the radical $R_1$ comprising an alkyl radical of at least two carbon atoms, and that R may comprise alkyl, cyclic or heterocyclic radicals. Further illustrative satisfactory inhibitors of this class include, methyl β-ethylsulfonylethyl sulfoxide, propyl β-ethylsulfonylethyl sulfoxide, butyl β-ethylsulfonylethyl sulfoxide, amyl β-ethylsulfonylethyl sulfoxide, hexyl β-ethylsulfonylethyl sulfoxide, methyl β-propylsulfonylethyl sulfoxide, ethyl β-propylsulfonylethyl sulfoxide, butyl β-propylsulfonylethyl sulfoxide, amyl β-propylsulfonylethyl sulfoxide, methyl β-propylsulfonylpropyl sulfoxide, ethyl β-propylsulfonylpropyl sulfoxide, propyl β-propylsulfonylpropyl sulfoxide, butyl β-propylsulfonylpropyl sulfoxide, methyl β-butylsulfonylbutyl sulfoxide, ethyl β-butylsulfonylbutyl sulfoxide, propyl β-butylsulfonylbutyl sulfoxide, butyl β-butylsulfonylbutyl sulfoxide, etc.

Typical examples of specific compounds containing cyclic radicals include cyclohexyl β-cyclohexylsulfonylethyl sulfoxide, cyclohexyl β-cyclohexylsulfonylpropyl sulfoxide, cyclohexyl β-cyclohexylsulfonylbutyl sulfoxide, etc., cyclohexyl β-ethylsulfonylethyl sulfoxide, cyclohexyl β-ethylsulfonylpropyl sulfoxide, cyclohexyl β-ethylsulfonylbutyl sulfoxide, etc., phenyl β-phenylsulfonylethyl sulfoxide, phenyl β-phenylsulfonylpropyl sulfoxide, phenyl β-phenylsulfonylbutyl sulfoxide, etc., phenyl β-ethylsulfonylethyl sulfoxide, phenyl β-ethylsulfonylpropyl sulfoxide, phenyl β-ethylsulfonylbutyl sulfoxide, etc., tolyl β-tolylsulfonylethyl sulfoxide, tolyl β-tolylsulfonylpropyl sulfoxide, tolyl β-tolylsulfonylbutyl sulfoxide, etc., tolyl β-ethylsulfonylethyl sulfoxide, tolyl β-ethylsulfonylpropyl, sulfoxide, tolyl β-ethylsulfonylbutyl sulfoxide, etc., pyridyl β-pyridylsulfonylethyl sulfoxide, pyridyl β-pyridylsulfonylpropyl sulfoxide, pyridyl β-pyridylsulfonylbutyl sulfoxide, etc., pyridyl β-ethylsulfonylethyl sulfoxide, pyridyl β-ethylsulfonylpropyl sulfoxide, pyridyl β-ethylsulfonylbutyl sulfoxide, etc, furyl β-furylsulfonylethyl sulfoxide, furyl β-furylsulfonylpropyl sulfoxide, furyl β-furylsulfonylbutyl sulfoxide, etc., furyl β-ethylsulfonylethyl sulfoxide, furyl β-ethylsulfonylpropyl sulfoxide, furyl β-ethylsulfonylbutyl sulfoxide, etc., thienyl β-thienylsulfonylethyl sulfoxide, thienyl β-thienyl sulfonyl propyl sulfoxide, thienylsulfonylbutyl sulfoxide, etc., thienyl β-ethylsulfonylethyl sulfoxide, thienyl β-ethylsulfonylpropyl sulfoxide, thienyl β-ethylsulfonylbutyl sulfoxide, etc., quinolyl β-quinolylsulfonylethyl sulfoxide, quinolyl β-quinolylsulfonylpropyl sulfoxide, quinolyl β-quinolylsulfonylbutyl sulfoxide, etc., quinolyl β-ethylsulfonylethyl sulfoxide, quinolyl β-ethylsulfonylpropyl sulfoxide, quinolyl β-ethylsulfonylbutyl sulfoxide, etc.

The inhibitors of the present invention may be prepared in any suitable manner. Preferred methods of manufacturing specific compounds are hereinafter described. These methods of preparation may be suitably modified to prepare analogous or related compounds by utilizing different reactants as desired.

Ethyl β-ethylthioethyl sulfone may be prepared as follows. 62 grams (1 mol) of ethyl mercaptan is added to a solution of 54 grams (1 mol) of sodium methylate in 150 cc. of methanol, and this mixture is slowly added to 500 cc. of ethylene chloride with vigorous stirring. The mixture is then boiled under reflux conditions for 1 hour. Sodium chloride is removed by filtration and the filtrate is then distilled. The methanol and excess ethylene chloride form an azeotrope boiling at about 60° C. The higher boiling products are distilled in vacuum to yield two products:

(1) 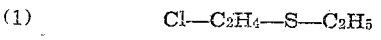

boiling at 55–58° C. under 22 mm. Hg pressure, and (2) 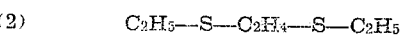

boiling at 99–104° C. at 22 mm. Hg pressure. The ethyl β-chloroethyl sulfide is oxidized in acetic acid solution with an excess of hydrogen peroxide (30%), the solvent and water is removed by distillation in vacuum, and the residue is poured into a solution of triethylamine and benzene. The product is filtered to remove triethyl amine hydrochloride and the filtrate is distilled to give:

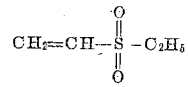

having a boiling point of 118–119° C. at 22 mm.

Hg pressure. The α,β-unsaturated sulfone adds ethyl mercaptan readily in the presence of a quaternary base, such as benzyl-trimethylammonium hydroxide, to yield ethyl β-ethylthioethyl sulfone having a boiling point of 127–129° C. at 2 mm. Hg pressure.

Ethyl β-ethylthioethyl sulfoxide may be prepared as follows. Ethyl β-chloroethyl sulfide, as prepared in the above manner, is oxidized in the presence of acetic acid with one equivalent of 30% hydrogen peroxide. The product boils at 137–139° C. at 26 mm. Hg pressure. The β-chloroethyl sulfoxide reacts readily with sodium ethyl mercaptide to yield ethyl β-ethylthioethyl sulfoxide.

1,2-bis-(ethylsulfinyl)-ethane is prepared by oxidizing 1,2-bis-(ethylthio)-ethane (11.4 grams) in acetic acid (100 cc.) with hydrogen peroxide (20 grams of 30%). The product is evaporated to dryness on a steam bath and then is crystallized from ethanol.

It is understood that the inhibitor composition may comprise the compounds specifically set forth herein in combination with diastomers formed in the manufacture of the inhibitor.

The inhibitor of the present invention is generally added to the organic material in amounts of less than 1% by weight. When used in edible fats and oils the inhibitor will generally be employed in amounts of from about 0.001% to about 0.5% by weight and when used in gasoline the inhibitor will generally be used in amounts above about 0.02% by weight. The inhibitor may be used alone or in conjunction with synergists, inhibitor activators, dyes, antiknock agents, etc., depending upon the material to be stabilized. For example, when used in edible fats and oils a synergist such as phosphoric acid or ascorbic acid will generally be used along with the inhibitor. When used in gasoline, lead tetraethyl, a dye and perhaps an inhibitor activator, such as certain types of alkylene polyamines, may be used.

The following examples are introduced to illustrate further the novelty and utility of the present invention, but not with the intention of unduly limiting the same.

In one series of determinations, the inhibitors of the present invention were utilized in a lard having a normal stability period of 4 hours as determined by the "Swift" test. This test is described in detail in the article by A. E. King, H. L. Roschen and W. H. Irwin, which appeared in the Oil and Soap, vol. X, No. 6, pages 106–109 (1933), and modified as described in the article by R. W. Riemenschneider, J. Turer, and R. M. Spec, which appeared in the Oil and Soap, pages 169–171, September, 1943. In general, this test comprises bubbling air through a sample of the lard until rancidity is determined organoleptically and by peroxide values.

EXAMPLE I

Ethyl β-ethylthioethyl sulfone, prepared in the manner hereinbefore set forth, was added in an amount of 0.02% by weight to the lard having a normal stability period of 4 hours and served to increase the stability period thereof to 27 hours.

EXAMPLE II 1,2-bis-(ethylsulfinyl)-ethane, prepared in the manner herein set forth, was added in an amount of 0.02% by weight to another sample of the lard and served to increase the stability time thereof to 25 hours.

EXAMPLE III

Ethyl β-ethylthioethyl sulfoxide, prepared in the manner hereinbefore set forth, was added in an amount of 0.02% by weight to another sample of the lard and served to increase the stability time thereof to 41 hours.

EXAMPLE IV

In this example, several inhibitors of the present invention were utilized for the stabilization of styrene. The runs with styrene were made in the following manner: The various samples were sealed in separate small glass tubes having long, thin necks. The tubes were heated at 80° C. for 10 hours and, in order to further accelerate deterioration, the tubes were heated for an additional two hours at 100° C. Periodically, the tubes were inverted and the change in viscosity was determined by observing "bubble time"; that is, the time necessary for a bubble to rise to the top of the thin neck when the tube was inverted at 25° C. This time can be determined with a reproducibility of about 0.2 second. Increase in viscosity indicated deterioration of the sample caused by oxidative deterioration, gum formation, polymerization, etc.

Sample 1 contained no inhibitor. Sample 2 contained 0.01% by weight of ethyl β-ethylthioethyl sulfone. Sample 3 contained 0.05% by weight of ethyl β-ethylthioethyl sulfone. Sample 4 contained 0.05% by weight of ethyl β-ethylthioethyl sulfoxide. The results are shown in the following table:

*Table I*

| Hours | Bubble time, Seconds at 25° C. | | | | | | |
|---|---|---|---|---|---|---|---|
|  | 0 | 2 | 4 | 6 | 8 | 10 | 12 |
| Sample: | | | | | | | |
| 1 | 1.0 | 1.4 | 2.4 | 3.2 | 6.2 | 8.8 | 41.4 |
| 2 | 1.0 | 1.2 | 1.4 | 1.4 | 1.4 | 1.4 | 4.8 |
| 3 | 1.2 | 1.0 | 1.2 | 1.4 | 1.4 | 1.4 | 1.4 |
| 4 | 1.2 | 1.2 | 1.2 | 1.4 | 1.4 | 1.4 | 3.8 |

From the above data it will be noted that the inhibitor compounds of the above entitled application served to effectively inhibit oxidative deterioration of styrene. It will be noted that after 10 hours heating at 80° C., sample 1 (containing no inhibitor) had a bubble time of 8.8 seconds whereas samples 2, 3 and 4 (containing added inhibitor) had bubble times of only 1.4 seconds. Furthermore, after 12 hours, the last 2 hours being conducted at 100° C., it will be noted that the sample without inhibitor had a bubble time of 41.4 seconds, thus indicating considerable deterioration, whereas the samples containing inhibitor had bubble times of 4.8 and lower.

EXAMPLE V

In this example, an inhibitor of the present invention was utilized for the stabilization of paraffin wax. The runs with paraffin wax were made in the following manner: A sample of the paraffin wax was placed in an A. S. T. M. Oxygen Bomb using sufficient wax to fill the glass container completely. The use of this large amount of sample leaves a relatively small volume for gas so that small changes in pressure may be more readily detected. The pressure on the bomb was raised to 120 pounds per square inch at room temperature with oxygen and it was then immersed in a hot water bath with an average temperature of about 211.8° F. The pressure rose to about 130 pounds per square inch in about 15 minutes and then dropped off slowly. The oxidations were continued until the pressure dropped to 90 pounds per square inch with the bomb at 211.8° F.

Sample 5 contained no inhibitor. Sample 6 contained 0.05% by weight of ethyl-β-n-hexyl-thioethyl sulfone. The following table shows the number of hours required for the pressure in each sample to drop to 90 pounds per square inch.

*Table II*

| Sample | Hours to reach 90 pounds pressure |
|---|---|
| 5 | 46 |
| 6 | 211 |

From the above data it will be noted that the inhibitor compound of the present application served to considerably retard oxidation of the paraffin wax. Oxidation is evidenced by the decrease in pressure due to the consumption of the oxygen by reaction thereof with the paraffin wax, and the rate of oxidation is measured by the time required to reach a final pressure of 90 pounds. It will be noted that the pressure of the sample without inhibitor dropped to 90 pounds in 46 hours, whereas the pressure of the sample containing the inhibitor required 211 hours before decreasing to 90 pounds, thereby indicating effective inhibiting of oxidation.

EXAMPLE VI

This example illustrates the use of an inhibitor of the present invention in the stabilization of rubber. 0.4% by weight of ethyl β-ethylthioethyl sulfoxide is added to the latex resulting from the emulsion polymerization of butadiene and styrene, after which the latex is coagulated and dried. The rubber so produced will be improved as to color, strength, elasticity, etc.

I claim as my invention:

1. A method of stabilizing an organic material subject to oxidative deterioration which comprises adding thereto an inhibitor having the following general formula:

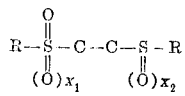

where R is an organic radical and $X_1$ and $X_2$ are selected from 0 and 1.

2. A method of stabilizing an organic material subject to oxidative deterioration which comprises adding thereto an inhibitor having the following general formula:

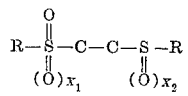

where R is an alkyl radical and $X_1$ and $X_2$ are selected from 0 and 1.

3. A method of stabilizing edible fats and oils against rancidity which comprises adding thereto an inhibitor having the following general formula:

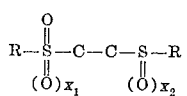

where R is an organic radical and $X_1$ and $X_2$ are selected from 0 and 1.

4. A method of stabilizing a hydrocarbon subject to oxidative deterioration which comprises adding thereto an inhibitor having the following general formula:

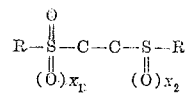

where R is an organic radical and $X_1$ and $X_2$ are selected from 0 and 1.

5. A method of stabilizing a fatty material subject to oxidative deterioration which comprises adding thereto an inhibitor having the following general formula:

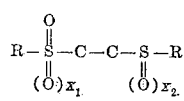

where R is an alkyl radical and $X_1$ and $X_2$ are selected from 0 and 1.

6. A method of stabilizing edible fats and oils against rancidity which comprises adding thereto from about 0.001% to about 0.5% by weight of an inhibitor having the following general formula:

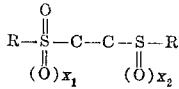

where R is an organic radical and $X_1$ and $X_2$ are selected from 0 and 1.

7. The method of claim 6 further characterized in that said inhibitor comprises an alkyl β-alkyl-thioalkyl sulfoxide.

8. The method of claim 6 further characterized in that said inhibitor comprises a 1,2-bis-(alkylsulfinyl)-alkane.

9. The method of claim 6 further characterized in that said inhibitor comprises an alkyl β-alkyl-thioalkyl sulfone.

10. A method of stabilizing lard against rancidity which comprises adding thereto from about 0.001% to about 0.5% by weight of ethyl β-ethylthioethyl sulfoxide.

11. A method of stabilizing lard against rancidity which comprises adding thereto from about 0.001% to about 0.5% by weight of 1,2-bis-(ethylsulfinyl)-ethane.

12. A method of stabilizing lard against rancidity which comprises adding thereto from about 0.001% to about 0.5% by weight of ethyl β-ethylthioethyl sulfone.

13. An organic material tending to deteriorate due to oxygen containing, in an amount sufficient to retard deterioration thereof, an inhibitor having the following general formula:

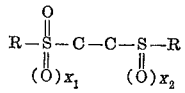

where R is an organic radical and $X_1$ and $X_2$ are selected from 0 and 1.

14. An organic material tending to deteriorate due to oxygen containing, in an amount sufficient to retard deterioration thereof, an inhibitor having the following general formula:

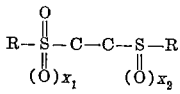

where R is an alkyl radical and $X_1$ and $X_2$ are selected from 0 and 1.

15. Hydrocarbons subject to oxidative deterioration containing, in an amount sufficient to retard deterioration thereof, an inhibitor having the following general formula:

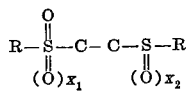

where R is an organic radical and $X_1$ and $X_2$ are selected from 0 and 1.

16. Edible fats and oils tending to become rancid containing, in an amount sufficient to retard rancidity, an inhibitor having the following general formula:

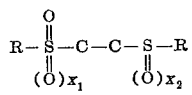

where R is an alkyl radical and $X_1$ and $X_2$ are selected from 0 and 1.

17. Edible fats and oils tending to become rancid containing, in an amount sufficient to retard rancidity, an alkyl β-alkylthioalkyl sulfoxide.

18. Edible fats and oils tending to become rancid containing, in an amount sufficient to retard rancidity, a 1,2-bis(alkylsulfinyl)-alkane.

19. Edible fats and oils tending to become rancid containing, in an amount sufficient to retard rancidity, an alkyl β-alkylthioalkyl sulfone.

20. Lard tending to become rancid containing from about 0.001% to about 0.5% by weight of ethyl β-ethylthioethyl sulfoxide.

21. Lard tending to become rancid containing from about 0.001% to about 0.5% by weight of 1,2-bis-(ethylsulfinyl)-ethane.

22. Lard tending to become rancid containing from about 0.001% to about 0.5% by weight of ethyl β-ethylthioethyl sulfone.

23. A fatty material normally subject to oxidative deterioration containing, in an amount sufficient to retard such deterioration, an inhibitor compound selected from the group consisting of an alkyl β-alkylthioalkyl sulfoxide, a 1,2-bis-(alkylsulfinyl)-alkane, an alkyl β-alkylthioalkyl sulfone and an alkyl β-alkylsulfonylalkyl sulfoxide.

24. A fatty material normally subject to oxidative deterioration containing 1,2-bis-(ethylsulfinyl)-ethane in an amount sufficient to retard such deterioration.

No references cited.